United States Patent [19]
Garcea et al.

[11] 3,854,053
[45] Dec. 10, 1974

[54] ELECTRIC POWER FEED CIRCUIT FOR UTILIZING DEVICES INSTALLED ON MOTOR VEHICLES

[75] Inventors: Giampaolo Garcea, Milan; Aldo Volontieri, Monza, both of Italy

[73] Assignee: Alfa Romeo S.p.A., Milan, Italy

[22] Filed: Dec. 29, 1972

[21] Appl. No.: 319,793

[30] Foreign Application Priority Data
Jan. 10, 1972  Italy............................ 19184/72

[52] U.S. Cl. ..................................... 290/38, 290/37
[51] Int. Cl. ............................................ F02n 11/08
[58] Field of Search.......................... 290/37, 38, 36

[56] References Cited
UNITED STATES PATENTS

| | | | |
|---|---|---|---|
| 3,443,112 | 5/1969 | Huntzinger | 290/38 |
| 3,502,895 | 3/1970 | Ballou | 290/38 X |
| 3,573,480 | 4/1971 | Cummins | 290/37 |
| 3,573,482 | 4/1971 | Brooks | 290/38 |

*Primary Examiner*—G. R. Simmons
*Attorney, Agent, or Firm*—Holman and Stern

[57] ABSTRACT

A power circuit for a motor vehicle is disclosed, in which switching means are provided which can be shifted from a first position in which the utilizing devices are connected to the storage battery of the motor car, through the usual key operated switch, and a second position where the devices are connected to the generator, means being also provided which are sensitive to the On or Off condition of the generator so as to shift the switching means from the first to the second position whenever the generator is becoming active. The object of the device is to stop the operation of the electric devices on board as the engine is started, for example, as a result of a road accident. Thus, for example, the fuel pump is immediately stopped as the engine is stopped and this is a factor for preventing fire hazards.

9 Claims, 4 Drawing Figures

3,854,053

ELECTRIC POWER FEED CIRCUIT FOR UTILIZING DEVICES INSTALLED ON MOTOR VEHICLES

BACKGROUND OF THE INVENTION

This invention relates to an electric power feeding circuit for utilizing devices installed on motor vehicles.

It is known that in the motor vehicles which are equipped with an internal combustion engine, as the engine is started, the driver actuates the several electric devices on board of the vehicle whereafter the engine is started by means of the conventional key switch, a first snap of the key, from the inactive position (usually called "off" position) to a first active position (usually called "one on position"), the main switch, inserted in the circuit which connects the storage battery to the electric devices which are necessary for the operation of the engine such as the fuel feed pump, is closed and, in the case of an engine having a spark ignition, the ignition distributor (spark generator); with a second snap of the key, from the aforesaid first position of insertion to the second insertion position (usually called "two on" position), the starting motor for the engine is actuated.

Inasmuch as the aforementioned electric utilizing devices are connected in a fixed manner to the storage battery through the key switch, they remain fed and thus operative until the key switch is in the position "one on," thus also in the case of a spontaneous stop of the engine. This fact involves the twofold risk of prejudicing the charge of the battery and, in the case that the stoppage of the engine is due to an accident, the risk of creating the premises for more serious consequences. More particularly, it may occur that, if the intake pipes from the fuel pump are broken and the pump continues to operate, a spillage of fuel may be experienced which, in the presence of sparks produced by the breakage of electric cables, may start a fire (that which obviously would not occur if the pump is stopped simultaneously with the engine stoppage).

SUMMARY OF THE INVENTION

It is thus an object of the present invention to provide an electric power feed circuit which provides for the automatic deactuation of the electric utilizing devices, more particularly of the fuel feed pump, in the case of a spontaneous stoppage of the engine.

With this object in view the circuit according to the invention has been developed, which is characterized in that it comprises switching means which can be switched from a first position of connection of the utilizing electric devices to the storage battery of the motor vehicle through the key switch and a second position of connection of the utilizing devices to the generator of the motor vehicle and then means sensitive to the operative condition of the generator which act upon the switching means so as to switch them from the first to said second position responsively to each actuation of the generator.

It is apparent that, since, due to the presence of the above-mentioned sensitive means, during the normal operation of the engine the several utilizing devices are connected to the generator and since the latter automatically stops the delivery of electric power as the mechanical actuation from engine is discontinued, every spontaneous stop of the engine automatically involves the deactivation of the utilizing devices and especially the fuel pump, the result being the preservation of the charge of the storage battery and the inherent suppression of any fire hazard or other accidents. At the same time, by acting in such a way that, when the engine is at stillstand, the utilizing devices are connected to the battery through the key switch (since the switching means are in the first position), it has been taken into account that certain utilizing devices, more particularly the fuel pump, should start their operation when the engine is still stationary (or when it is rotating at a low rate), that is before the generator begins to deliver its electric power.

BRIEF DESCRIPTION OF THE DRAWINGS

The foregoing and other features of the present invention, along with the advantages stemming therefrom, will become apparent upon a scrutiny of the ensuing detailed description, given by way of non-limiting example only, of a few embodiments of the circuit according to the invention. In such a detailed description reference will be had to the accompanying drawings, wherein.

DESCRIPTION OF THE PREFERRED EMBODIMENTS

Figure 1:
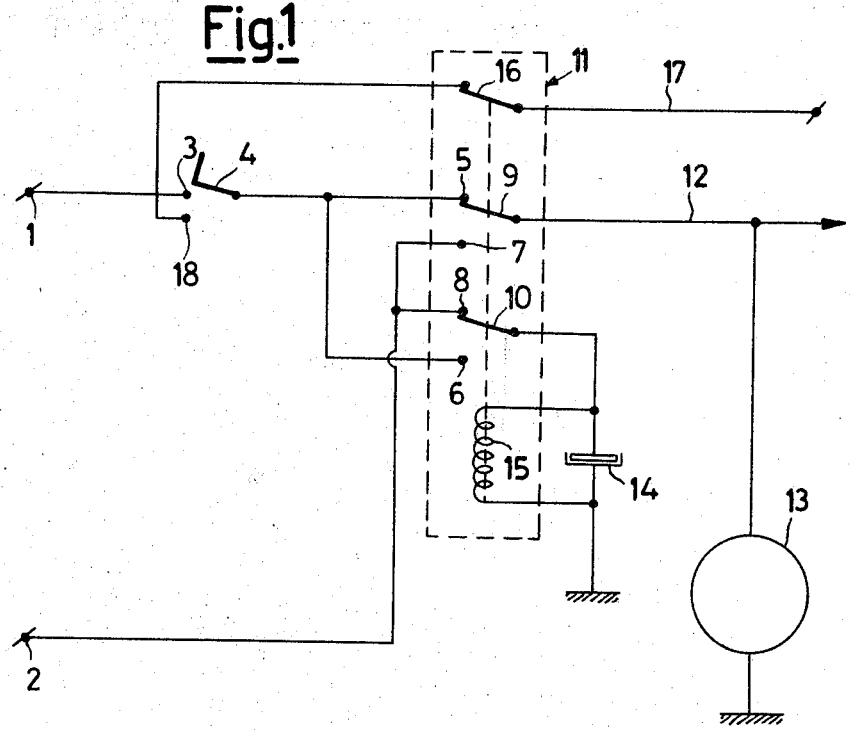
FIG. 1 shows a first embodiment of the circuit according to the invention.

The circuit shown in FIG. 1 comprises, above all, two feed terminals 1 and 2, the first of which is connected to the storage battery of the motor vehicle (not shown) and the second connected to the generator of the motor vehicle (not shown) upstream of the cutoff device conventionally provided between the generator and the battery. The terminal 1 is connected to a fixed contact 3, which is separated by a movable contact 4, which shows the key switch of the motor vehicle, (the separation occurs when the key switch is in the Off position) or connects (when the key switch is in the One On position or the Two ON position) relatively to two additional fixed contacts 5 and 6 which are interlocked. These latter are respectively engageable, in alternative with other two fixed contact 7 and 8 connected to the terminal 2, by two movable contacts 9 and 10 of a relay 11 shown in FIG. 1 in its at rest position. The movable contact 9 is connected to a lead 12 which has the task of bringing the power feed to the several electric utilizing devices of the vehicle (and more particularly to the fuel feed pump 13), whereas the movable contact 10 is connected to the ground through the parallel connection of a capacitor 14 and a coil 15 which is the control coiling of a relay 11. The latter also comprises another movable contact 16, integral with the first two contacts, which has the task of closing and opening the connection between a lead 17 for feeding the starting motor of the vehicle and a fixed contact 18 intended to be temporarily engaged by the movable contact 4 when the key switch is brought to the "two on" position.

In operation, when the driver switches the key switch from the "off" position to the One On position, thus establishing the connection between the contacts 3 and 4, the pump 13 and the other utilizing electric devices are connected to the battery through the terminal 1, the contacts 3 and 4, the contacts 5 and 9 and the lead 12 and consequently they are actuated before the starting of the engine.

Subsequently, when the driver temporarily switches the key switch to the position Two On, thus establishing a temporary connection between the contacts 4 and 18, the starting engine is actuated and the engine is thus started. The generator now begins to deliver current so that through the contacts 8 and 10 the coil 15 is energized (together with the capacitor 14) and the relay 11 is energized. The movable contacts 9 and 10 are thus displaced to the position of engagement with the fixed contacts 7 and 6, whereas the movable contact 16 is shifted to the position of opening of the connection between the lead 17 and the fixed contact 18. The switching of the movable contact 9 acts in such a way that the pump 13 and the other utilizing devices are now fed by the generator rather than by the storage battery, while the switching of the movable contact 10 causes the coil 15 (which is kept energized by the capacitor 14 during switching) to be connected to the battery. The switching of the movable contact 16 has then the purpose of cutting off the feed to the starting motor in the case that the driver, being unaware of the fact that the engine has been started, still tries to actuate the motor by shifting again the key switch to the position Two On.

In the case of a spontaneous stoppage of the engine, for example as a result of an accident, the generator ceases to deliver current, so that the pump 13 and the other electric utilizing devices connected to the lead 12 are immediately put to idle conditions. It is thus avoided that a prolonged activity of the utilizing devices has a negative bearing on the charge of the battery and at the same time the danger is avoided of complications such as fire in the case of spillage of fuel from the delivery ducts of the pump.

To restore the idle conditions of FIG. 1 it is then sufficient to bring the key switch to the Off position again, so that the movable contact 4 is disengaged from the fixed contact 3. As it is no longer fed, the coil 15 is actually de-energized, and the movable contacts 9, 10 and 16 are brought to the position of FIG. 1 again and preset the circuit once more for a new start of the engine and of the several electric devices intended to operate it.

Figure 2:
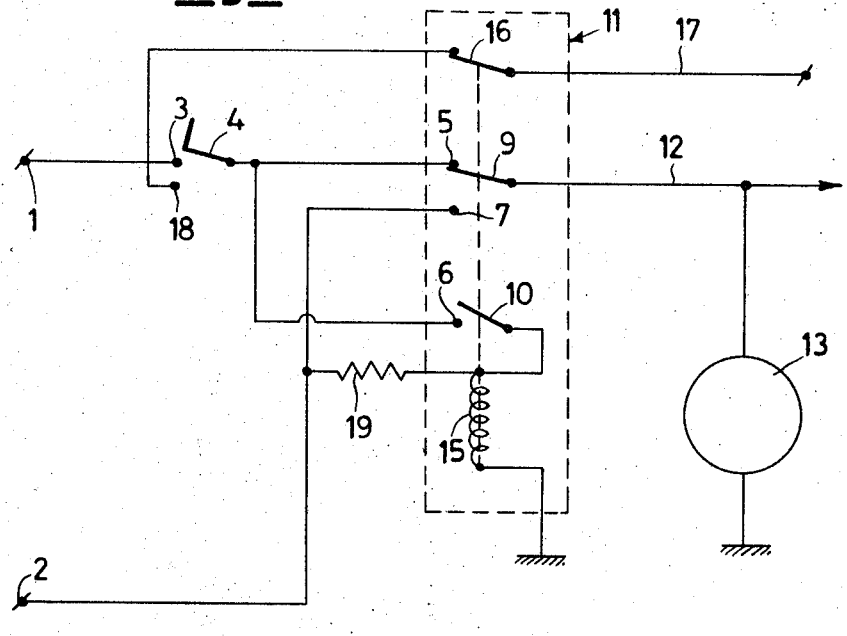
FIG. 2 shows a second embodiment of the circuit according to the invention.

FIG. 2 shows another embodiment of the circuit according to the invention, which is different from that of FIG. 1 only for the fact that the capacitor 14 and the contact 8 are dispersed with and that between the terminal 2 and the end of the coil 15 which is directly connected to the movable contact 10, there is arranged a resistor 19 having a high ohmage rating.

The operation is virtually the same as that of the embodiment of FIG. 1 with the exception that energizing current for the coil 15 is now supplied by the generator through the resistor 19, whose high ohmage is such that when the relay 11 is switched the current delivered by the generator is almost entirely fed to the lead 12 and thus towards the pump 13 and the other utilizing devices.

Figure 3:
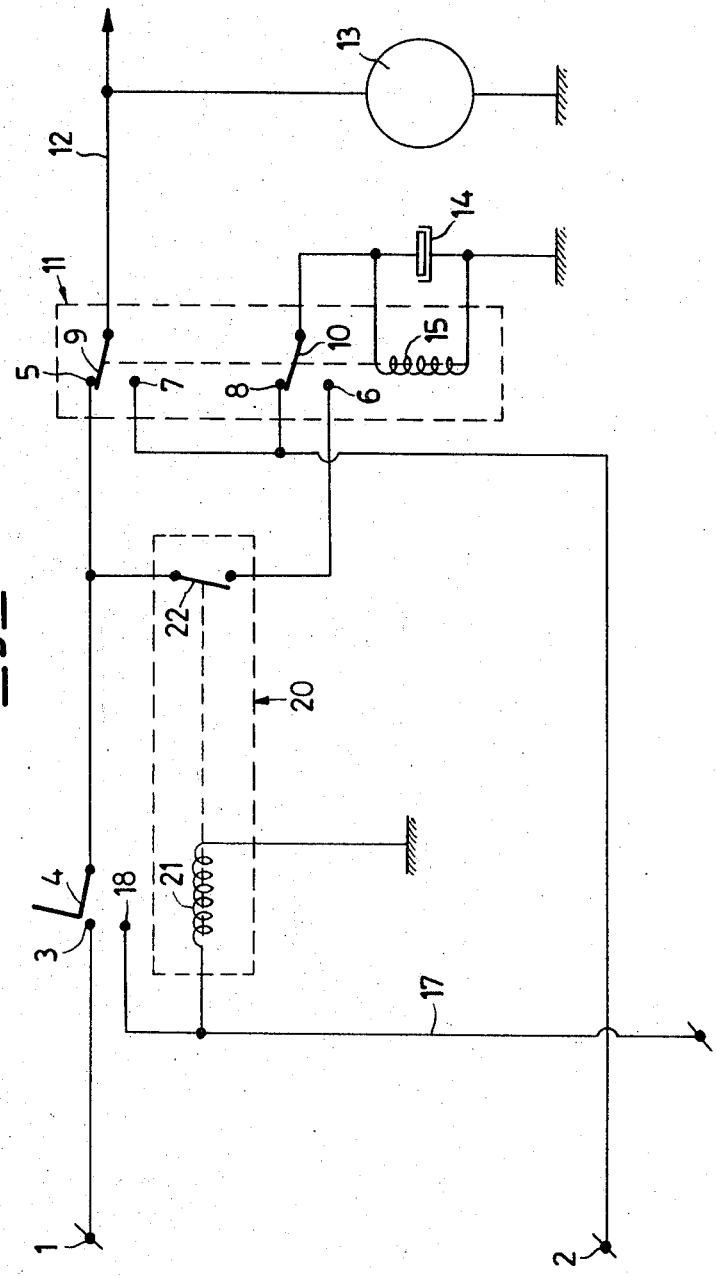
FIG. 3 shows a third embodiment of the circuit according to the invention.

FIG. 3 shows another embodiment of the circuit according to the invention, which differs in turn from that of FIG. 1 only for the absence of the movable contact 16 and the presence of a relay 20 formed of a coil 21 inserted between the fixed contact 18 and the mass and a movable contact 22 inserted between the contacts 4 and 6. The presence of the relay 20 prevents the necessity of bringing the key switch to the Off position to restore the at rest position of the relay 11 after a spontaneous stoppage of the engine. In this case, it is just sufficient to bring the key switch again to the Two On position for actuating the starting motor again to energize the coil 21 and thus cause the movable contact 22 to be opened, and, with the resultant de-energization of the relay 11, the new connection of the pump 13 and the other utilizing devices to the battery of the car. For the remainder, the operation of the circuit of FIG. 3 is exactly the same as that of the circuit of FIG. 1.

Figure 4:
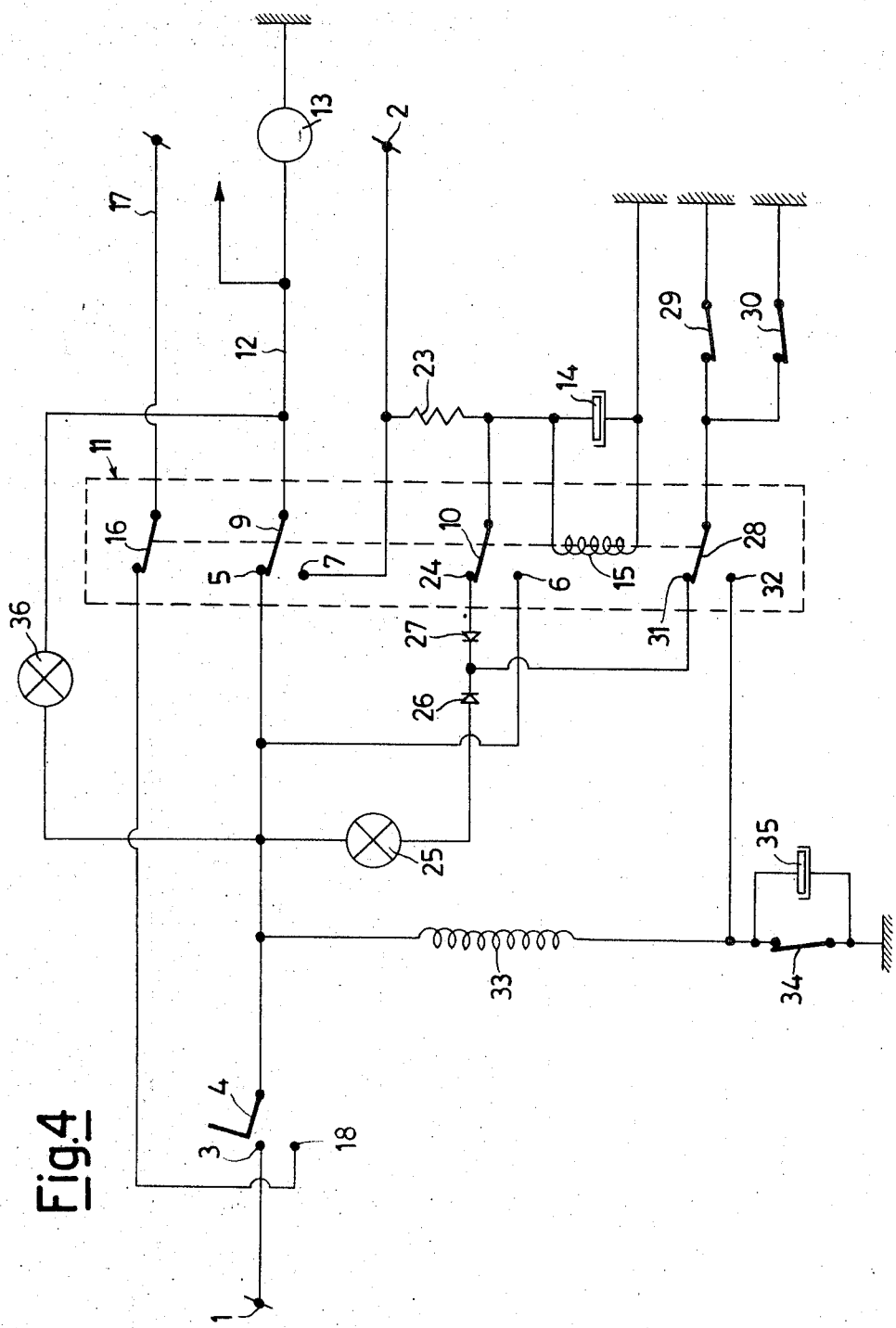
FIG. 4 shows a fourth embodiment of the circuit according to the invention.

FIG. 4 then shows a further embodiment of the circuit according to the invention, which in turn exhibits the following differences over that of FIG. 1. The fixed contact 8 is suppressed and the movable contact 10 is connected also to the terminal 2 through a resistor 23 and is adapted to engage alternatingly the fixed contact 6 and another fixed contact 24 connected to the movable contact 4 through a series connection of a pilot lamp 25 and two diodes 26 and 27 having interconnected cathodes, the relay 11 comprises a further movable contact 28 which is grounded through the parallel connection of two switches 29 and 30 which are a part of respective pressurestats sensitive to the pressure of the oil and the fuel on the delivery sides of the respective pumps (the switches 29 and 30 are opened when the relative pressurestats detect a pressure over that of a minimum preselected value) and is adapted to be alternatingly engaged by a fixed contact 31 as connected to the interconnected cathodes of the diodes 26 and 27 and with another fixed contact 32 connected to the movable contact 4 through the primary winding 33 of the ignition coil and to the ground through the parallel connection of the contact breaker 34 and the capacitor 35 of the ignition system, and is finally provided a further pilot lamp 36 inserted between the movable contact 4 and the lead 12 in parallel with the movable contact 9 of the relay 11.

In operation, as the driver shifts the key switch from the Off position to the position One On, the pump 13 and the other utilizing devices are connected to the battery through the terminal 1, the contacts 3, 4, 5 and 9 and the lead 12 and consequently are actuated prior to the engine starting. The pilot lamp 36 is off whereas, due to the initial position of the movable contacts 28, 29 and 30 (the diode 27 prevents the coil 15 from being energized by the current coming from the battery), the pilot lamp 25 is on. Lastly the primary windng 33 of the ignition coil is grounded due to the effect of the closure of the contact breaker 34.

Subsequently, when the driver instantaneously shifts the key switch to the position Two On, the starting motor is energized so that the engine is started. The generator now begins to give a current which, through the resistor 23, causes the energization of the coil 15 (the diode 26 prevents the current from flowing towards the pilot lamp 25 in the case that the battery is not fully loaded and the generator delivers current at a voltage higher than that of the battery). Consequently the movable contacts 9, 10, 16 and 28 are shifted to position of FIG. 4 thus respectively effecting the connection of the pump 13 and the other utilizing devices to the generator (the resistor 23, having a high ohmage, prevents the current coming from the generator from flowing towards the coil 15), the connection of the coil 15 to the battery, the opening of the connection between the lead 17 and the fixed contact 18 (the result being of rendering inoperative a possible further shift of the key switch to the "two on" position) and the servoing of the coil 33 to the two switches 29 and 30 (which however are both open in this stage of operation). In addition the pilot lamp 25 is extinguished.

If the engine is spontaneously stopped, the generator ceases to deliver current so that the pump 13 and the other utilizing devices are immediately put out of operation. The pilot lamp 36 in turn is lighted and indicates to the driver that the fuel pump has been acted upon.

The pump 13 is stopped also in the case that accidents occur which, even if they do not cause an immediate stoppage of the engine, equally involve irregular operative conditions with a lowering of the pressure in the lubrication oil circuit or the fuel circuit for feeding the engine, below the usual values. In such situation, in point of fact, the switch 29 or the situations, 30 are closed and put to ground the coil 33 through the contact 32 and 28 and thus cut off the operation of the spark generator. The engine is thus stopped and since also the generator is stopped, the fuel pump and the other utilizing devices associated with the lead 12 are put out of operation.

To restore the at rest condition of FIG. 4 it is sufficient to bring the key switch to the Off position again. Thus the contacts 3 and 4 are opened, thus interrupting the feed to the coil 15 and causing the de-energization of the relay 11.

What is claimed is:

1. An electric power feeding circuit for utilizing devices such as fuel feed pump installed on a motor vehicle powered by an internal combustion engine, comprising in combination:
    a storage battery;
    a generator;
    key switch means being selectively operated in an inactive position, a first active position and a second active position;
    switching means being shiftable between a first position and a second position for connecting alternatively the utilizing devices to the battery or to the generator, said switching means connecting the utilizing devices to the battery when said switching means is in the first position and said key switch means is switched from the inactive position to the first active position for actuating the utilizing devices before the engine of the motor vehicle is started and before the generator consequently begins to deliver its electric power, said key switch means being subsequently switched temporarily to the second active position for starting the engine and thus activating the generator, said switching means connecting the utilizing devices to the generator when said switching means is in the second position and said key switch means is operated in the first active position; and
    means responsive to the operating conditions of the generator for shifting said switching means from the first position to the second position when the generator is actuated, thereby providing automatic deactuation of the utilizing devices when the engine is stopped spontaneously and thus preventing discharge of the storage battery and suppressing of any fire hazards.

2. A circuit according to claim 1, wherein said switching means are formed by a first movable contact which is a part of a relay, and wherein said sensitive means is formed as the energization coil of the relay, the coil being connected to the generator at least up to the instant of switching of said movable contact from said first position to said second position.

3. A circuit according to claim 2, wherein said relay also comprises another movable contact which can be shifted, integrally with said first movable contact, from a first position in which said energization coil is connected to the generator to a second position in which said energization coil is connected to the battery through said key switch means.

4. A circuit according to claim 2, wherein said energization coil is constantly connected to the generator through a high ohmage resistor and wherein said relay also comprises another movable contact which can be shifted, integrally with said first movable contact, between an opening position and a closure position of a connection of said energization coil to the battery through said key switch means.

5. A circuit according to claim 3, further including a capacitor arranged in parallel with respect to said energization coil.

6. A circuit according to claim 3, further comprising means sensitive to the displacements of said key switch means which act upon the connection realized between said energization coil and the battery after the displacement of said other movable contact to said second position so as to cut off said connection at every shift of said key switch means to the second active position in which the engine is started.

7. A circuit according to claim 2, wherein said relay comprises still another movable contact which can be switched, integrally with said first movable contact, between a closure position and an opening position of the connection between the engine and a fixed contact which can be engaged by said key switch means for controlling the starting of the engine.

8. A circuit according to claim 2 to, wherein said relay comprises an additional movable contact which can be shifted, integrally with said first movable contact, between a position of opening to a closure position of the connection between the coil of the spark generating system and the ground which comprises at least one switch sensitive to the pressure of the lubricant oil.

9. A circuit according to claim 8, wherein is connected in parallel to said at least one switch sensitive to the pressure of the lubricant oil.

* * * * *